United States Patent Office 2,719,131
Patented Sept. 27, 1955

2,719,131

PRODUCTION OF P-XYLENE POLYMERS

Luther A. R. Hall, Wilmington, Del., assignor to E. I. du Pont de Nemours and Company, Wilmington, Del., a corporation of Delaware No Drawing. Application May 15, 1953,
Serial No. 355,401

8 Claims. (Cl. 260—2)

This invention relates to a novel composition of matter. More specifically, it relates to a process for the preparation of a polymer having a recurring unit of the structure:

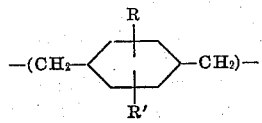

wherein R and R' represent nuclear hydrogen or one or more substituents for nuclear hydrogen. The hexagon represents the benzene nucleus. This material is referred to herein as a poly-p-xylene. By this term is meant any polymer of a p-xylene, i. e., p-xylene per se, substituted p-xylene and mixtures thereof, including the homopolymer of p-xylene, the homopolymer of its nuclear substituted derivatives as well as copolymers and mixtures of polymers of these monomers.

It is an object of the present invention to provide a novel process for the preparation of a composition of matter comprising poly-p-xylene and/or its nuclear substituted derivatives.

Another object is to provide a catalyst for use in the production of poly-p-xylene and/or substituted poly-p-xylenes by pyrolysis of vapors of p-xylene and/or nuclear substituted p-xylenes.

These and other objects will become apparent in the course of the following specification and claims.

In accordance with the present invention, a process for preparing a poly-p-xylene is provided wherein the vapors of p-xylene, nuclear substituted p-xylenes and mixtures thereof are pyrolyzed in the presence of chlorine gas.

It is known that a polymer can be produced by pyrolysis of the vapors of a p-xylene. A typical process is described in British Pat. No. 650,947 (March 7, 1951). In this process, the p-xylene is vaporized, pyrolyzed and thereafter cooled. Polymer formation occurs on the wall of the cooling chamber. Pyrolysis is performed within a tube, preferably packed with inert particles to improve heat transfer. At times it has beeen found advisable to dilute the monomer vapor with an innocuous gas such as nitrogen.

In addition to its utility as a coating composition having thermal stability and being insoluble in many normal solvents, as is illustrated in the above identified British patent, the materials may also be used in the production of shaped articles and coatings of all kinds as shown in British Patent No. 640,494 (June 19, 1950). The materials are also known to possess good heat and electrical insulating properties and are particularly useful for electrical insulation where high temperatures are encountered as disclosed in British Patent 673,651 (June 30, 1952).

The following example is cited to illustrate the invention and is not intended to limit it in any manner.

*Example*

Liquid p-xylene is vaporized at reduced pressure at 70° C. The efflux vapors are mixed with chlorine gas to produce a feed for the pyrolysis tube having a chlorine content of 37%. The feed mixture of monomer and catalyst is introduced at a pressure of 3–6 millimeters into a 15" quartz tube having an inside diameter of 1.38" and packed with small pieces of quartz tubing. The flow is controlled so that about sixty grams of monomer are consumed per hour. The pyrolysis tube is maintained at a temperature within the limits of 950 and 960° C. The pyrolyzed gases then pass into a receiver maintained at about room temperature. Polymer is deposited on the walls of the receiver. The unreacted vapors are then led into a monomer recovery unit which is maintained at the temperature of a Dry Ice-acetone bath. p-Xylene is condensed out and is available for recycling. The chlorine may also be recovered. The yield of purified polymer is 75% at a conversion of 30% per pass.

When the above process is performed without the chlorine catalyst, the conversion drops to only 12%.

The method of vaporizing the monomer is not critical. It is sometimes convenient to drop it directly into the pyrolysis tube. In this modification, the liquid is vaporized on contact within the pyrolysis zone. Monomer vapor may also be formed by distilling the liquid from a still-pot connected to the gas inlet of the pyrolysis tube. Another variation entails the entraining of monomer vapors in a stream of nitrogen or other gas introduced through a capillary at temperatures near the monomer boiling point. As previously pointed out, the use of such diluent gases is sometimes advantageous, particularly in control of reaction conditions. Such gases may also be introduced in the pyrolysis zone or mixed with the chlorine catalyst.

In general, it has been found that the diluent may comprise as much as about 95% of the gases within the pyrolysis zone. Economic factors govern the choice of conditions. In general, it is preferred to operate under conditions such that the combined partial pressures of chlorine and a monomer do not exceed 10 mm.

The chlorine catalyst is effective even when present as a trace. However, it has been found advantageous to employ at least 18%, based on the combined weight of monomer and chlorine. It is preferred to employ from about 18 to about 37%. Larger amounts up to as much as 50% may be employed without deleterious effects.

The chlorine catalyst may, if desired, be added prior to the pyrolysis of the monomer. It may be added directly to the vaporizer unit. It may also be added immediately before the pyrolysis zone. A baffle system is beneficial in the mixing of the gases. To produce chlorine-free products, it is necessary to add chlorine to the monomer at a temperature below 700° C. and then pyrolyze. Mixing chlorine and monomer during pyrolysis (or at temperatures above 700° C.) results in the formation of chlorinated polymers. Use of chlorine concentrations above 50% tends to produce chlorinated products under any mixing conditions.

An attempt to substitute iodine as a catalyst in this process results in the formation of p-xylylene diiodide as the sole product of the reaction. Thus, iodine inhibits the polymerization reaction completely. Bromine operates in a similar fashion and acts as an inhibitor. When bromine is added to the monomer vapors, the conversion of monomer to polymer on pyrolysis is reduced from about 12% to about 2%. Use of more drastic conditions fails to increase the conversion materially.

The preferred temperature range for the pyrolysis step is between 925 and 975° C. Control of the temperature within the range from 950 to about 960° C. has been found particularly effective. The catalyst permits operation at lower temperatures than is possible without it. For example, the lower practical operating temperature limit is reduced from about 900° C. to about 750° C.

Polymerization occurs upon condensation of the pyrolyzed vapors upon a relatively cool surface. The polymer forms as a film which can be easily stripped. The material of construction of the collecting surface is not critical. Temperatures as high as 170° C. still permit collection of the polymer. No polymer formation is observed at 180° C. A surface at room temperature is preferred. If it is desired to collect the polymer as a dispersion, this may be done by passing the pyrolyzed vapors into the surface of a moving dispersion medium such as tetralin.

After passage through the polymerizer, the exit gases are fed through a chamber maintained at Dry Ice-acetone temperature, i. e. about —50 to about —70° C., in order to separate the monomer. Chlorine may be recovered separately. Conventional baffling is employed to capture entrained liquids. The liquid monomer is available for recycling.

While the invention has been described particularly with reference to polymers of p-xylene, it is applicable as well to all polymers, copolymers and mixed polymers produced from a monomer having the structural formula:

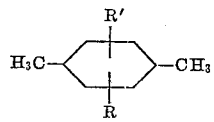

wherein R and R' represent nuclear hydrogen or one or more substituents for nuclear hydrogen. The preferred species are those in which R and R' represent a member of the group consisting of nuclear hydrogen, phenyl, methyl and halide. The chloride is preferred among the various halides. Among such polymers may be mentioned polypseudocumene, the copolymer of p-xylene and pseudocumene, polydurene, polychloro-p-xylene, polyphenyl-p-xylene and the like.

Many other modifications will be apparent to those skilled in the art from reading the disclosure herein without a departure from the inventive concept.

What is claimed is:

1. A process for the production of a poly-p-xylene which comprises pyrolyzing a mixture of a gaseous p-xylene and chlorine wherein concentration of the said gaseous p-xylene is at least equal to that of the said chlorine and thereafter cooling the pyrolyzed mixture.

2. The process of claim 1 wherein the chlorine is introduced in the monomer vaporizer.

3. The process of claim 1 wherein the polymer is collected on a surface.

4. The process of claim 1 wherein pyrolysis is performed within a quartz tube.

5. The process of claim 1 wherein the poly-p-xylene is the homopolymer of p-xylene.

6. The process of claim 1 wherein an inert diluent is used in the reaction mixture.

7. The process of claim 1, wherein concentration of the chlorine is at least 18% of the combined weight of the said gaseous p-xylene and the said chlorine.

8. The process of claim 1 wherein the concentration of chlorine is from about 18% to about 37% of the combined weight of the said gaseous p-xylene and chlorine.

References Cited in the file of this patent

FOREIGN PATENTS 650,947    Great Britain _____ Mar. 7, 1951